United States Patent [19]

Lewis et al.

[11] 4,352,444
[45] Oct. 5, 1982

[54] CONTROLLABLE VOLUME DOSING DEVICE

[75] Inventors: Roy D. Lewis, Färjestaden; Bernt V. Borg, Kalmar, both of Sweden

[73] Assignee: Norden Packaging Machinery Aktiebolag, Sweden

[21] Appl. No.: 112,547

[22] Filed: Jan. 16, 1980

[30] Foreign Application Priority Data

Jan. 17, 1979 [SE] Sweden ................................. 7900399

[51] Int. Cl.³ .............................................. G01F 11/06
[52] U.S. Cl. .................................... 222/309; 222/320; 222/333; 141/261
[58] Field of Search ............... 222/309, 287, 320, 333, 222/257; 141/261

[56] References Cited

U.S. PATENT DOCUMENTS

| 1,000,965 | 8/1911 | Davis | 222/309 X |
| 2,315,162 | 3/1943 | Rasmussen | 222/287 X |
| 2,611,524 | 9/1952 | Taylor | 222/309 X |
| 3,297,210 | 1/1967 | Lucas | 222/333 X |
| 3,381,854 | 5/1968 | Blanchet | 222/309 X |
| 3,565,298 | 2/1971 | Ohlin et al. | 222/309 |
| 4,120,202 | 10/1978 | Range et al. | 222/309 X |
| 4,227,627 | 10/1980 | Bennett | 222/309 X |

FOREIGN PATENT DOCUMENTS

| 220734 | 8/1957 | Australia | 222/309 |
| 2045837 | 4/1971 | Fed. Rep. of Germany | 222/309 |

Primary Examiner—Charles A. Marmor
Attorney, Agent, or Firm—Lerner, David, Littenberg & Samuel

[57] ABSTRACT

A controllable volume dosing device for providing a measured dose of material. The volume dosing device comprises a cylinder having a piston movably mounted therein for movement between a first end position and a second end position, and drive device for moving the piston between the two end positions. A valve is provided associated with the cylinder and which is positionable in a first valve position in which material may be introduced into the cylinder and a second valve position in which material may be expelled from the cylinder. The displacement of the piston within the cylinder between the first and second end positions controls the volume of the dose of such material. An adjustable stop member associated with the piston is provided for defining the first end position of the piston. The adjustable stop member is adjustably positioned to engage a member connected to the piston to set the location of the first end position to thereby control the amount of displacement of the piston between the first and second end positions. In this way, adjustment of the volume of a dose of material to be dispensed from the cylinder may be easily and simply controlled.

17 Claims, 4 Drawing Figures

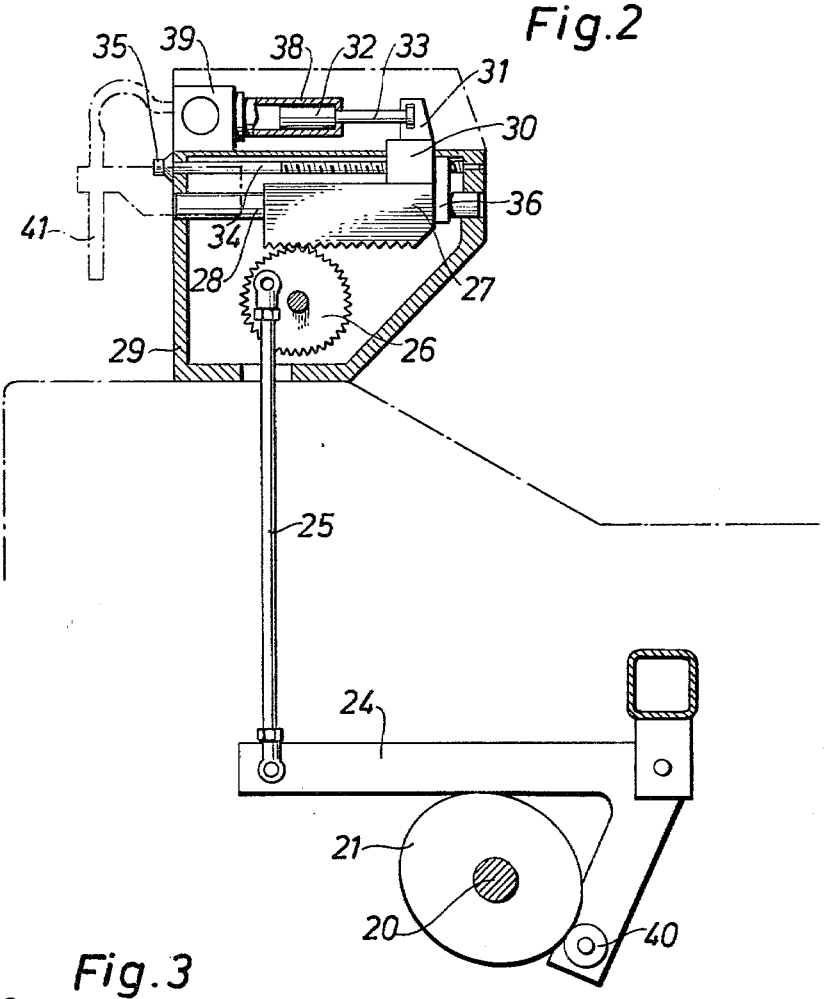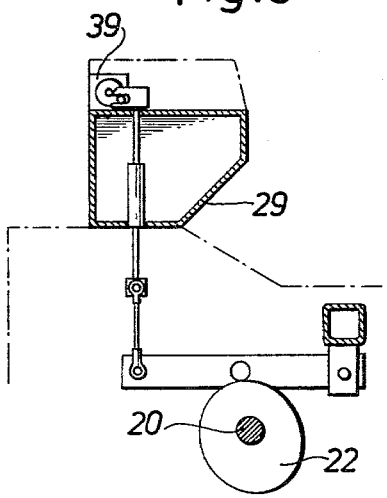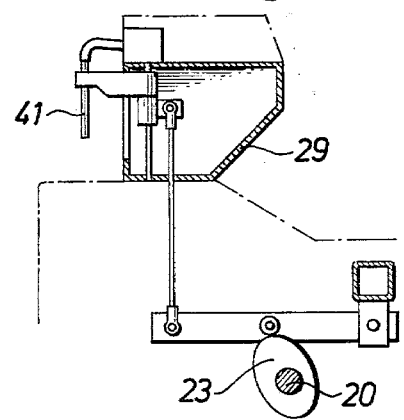

CONTROLLABLE VOLUME DOSING DEVICE

BACKGROUND OF THE INVENTION

The present invention relates to volume dosing devices or pumps, and more particularly such volume dosing devices whch are of the type used in connection with packaging machinery for filling a certain package or container with a predetermined volume of filling goods or material.

Volume dosing devices for filling of containers with a predetermined volume of material are generally known. Many of these prior art devices have only been capable of maintaining the desired exactness of a measured dose for a short period of time, after which the volume of the dose dispensed diverges more and more from stipulated tolerances. Some known solutions to this problem in the past have been to provide an adjustment, to a limited extent, of the positioning of the piston on the piston rod to thereby adjust the displacement stroke of the piston in the piston cylinder of the dosing device. However, such arrangements have not been capable of adjusting the volume to a large extent such as when the filling volume for different types of containers to be served by the dosing device deviates considerably. Rather, in those instances, it has been necessary to replace or alternately to adjust one or several elements in the force transmission mechanism of the piston.

While such arrangements may have been capable of providing an adjustable maximum exact dosing for the dosing device, these known solutions have not been very appealing since the adjustment requires a rather considerable manipulation and complexity, especially if the filler mechanism is to be adjusted to accommodate largely deviating filling volumes. Further, with such devices, in addition to being inconvenient in terms of adjustment, the accuracy of the measured dose to be dispensed is not always assured especially in light of uncontrollable and increasing play in the transmission mechanism after a certain time of operation. Consequently, there exists a need for an improved adjustable volume dosing device which utilizes a minimum of complex mechanism for accomplishing such adjustment.

SUMMARY OF THE INVENTION

These and other disadvantages of the prior art are overcome in accordance with the present invention which provides an improved controllable volume dosing device for providing a measured dose of material. The controllable volume dosing device of the present invention comprises a cylinder and piston means which includes a piston movably mounted for movement within the cylinder between a first end position and a second end position. Moving means are provided for moving the piston means, and a valve is provided associated with the cylinder. The valve is positionable in a first valve position in which material may be introduced into the cylinder and in a second valve position in which material may be expelled or dispensed from the cylinder. The displacement of the piston within the cylinder between the first and second end positions thus controls the volume of a dose of material. An adjustable stop member associated with the piston means is provided for defining the first end position of the piston. The adjustable stop member is adjustably positioned to engage the piston means to set the location of the first end position to thereby control the amount of displacement of the piston between the first and second end positions. In this way, an accurate and exact measured dose of material may be easily obtained. At the same time, the volume of the dose may be easily and accurately adjusted by adjusting the adjustable stop member to change the first end position of the piston.

In accordance with the preferred embodiment of the present invention, the piston means comprises a piston rod connected at one end to the piston and including at the other end thereof piston rod engaging means engagable by the adjustable stop member. Further, the moving means comprises linear drive means for linearly driving the piston rod to move the piston between the first and second end positions, and the adjustable stop member is movable along a stop member path of movement which is parallel to the path of movement of the piston, the location of the adjustable stop member being adjustable along the stop member path of movement.

Further, in accordance with the preferred embodiment, adjusting means is provided comprising a threaded member mounted to a support structure for supporting the cylinder and which threadably engages the stop member so that rotation of the threaded member causes the stop member to move along the stop member path of movement. Further, the piston rod engaging means includes rack member which is adapted to be driven by the linear drive means to drive the piston rod to thereby move the piston. Thus, since the stop member engages the piston rod engaging means, the stop member serves to limit the movement of the rack member when the piston is in the first end position.

These and further features and characteristics of the present invention will be apparent from the following detailed description in which reference is made to the enclosed drawings which illustrate a preferred embodiment of the present invention.

BRIEF DESCRIPTION OF THE DRAWINGS

FIG. 2 is a schematic side elevational view of the volume dosing device in accordance with the present invention.

FIG. 3 is a schematic sectional view illustrating a valve setting mechanism for positioning of the valve in the first and second valve positions, in accordance with the present invention.

FIG. 4 is a schematic sectional view illustrating means for raising and lowering of a valve nozzle of the volume dosing device, in accordance with the present invention.

DETAILED DESCRIPTION OF THE PREFERRED EMBODIMENT

Figure 1:
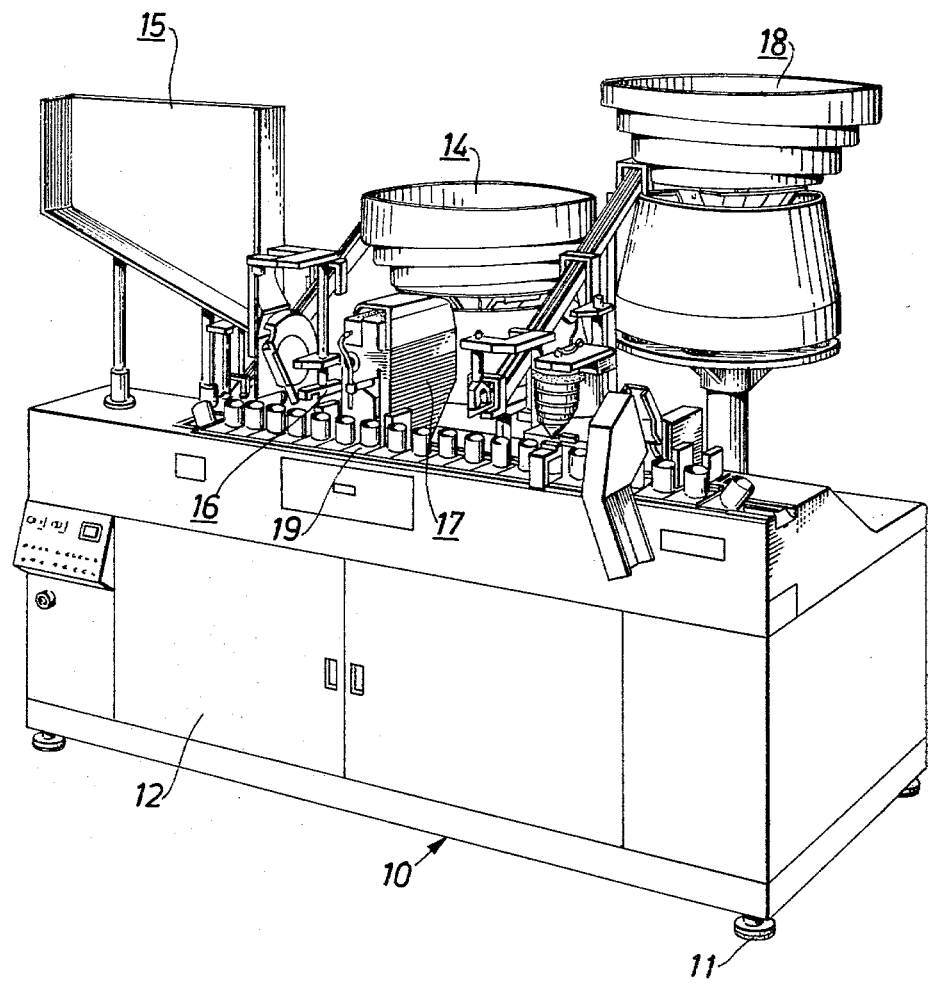
FIG. 1 is a schematic perspective view showing a packaging apparatus in which the controllable volume dosing device in accordance with the present invention may be used.

Referring now to the drawings wherein like reference characters represent like elements, there is shown in FIG. 1, a machine or apparatus 10 for assembling and filling containers of a type having a cylindrical sleeve with a closed end having an opening therein, and having a displacable plunger movable within the cylindrical sleeved towards and away from the opening. The container is adapted to be filled with a specified dose of filling material by means of the volume dosing device in accordance with the present invention. The entire machine 10 is more fully described in copending application Ser. No. 112,546, entitled "Method and Apparatus for Handling Packaging Containers" filed on even date herewith. Briefly however, it is to be noted that the machine 10 is arranged to be placed onto a horizontal support for resting thereon by means of feet 11 and that the major parts of the machine 10 are covered by covering plates and openable lids 12.

In the specific case that has been shown in FIG. 1, the machine 10 has five processing stations 14–18 for performing a sequence of processing steps on a packaging container, which in the present case consists of a container basically comprised of three parts. In the station 14 sockets on a conveyor 19 are supplied with bottoms or displaceable plungers of bottle-like packaging containers. In station 15 the bottle-shaped container sleeves are inserted into the sockets. The sleeves each have an open end and a closed end, and the closed end of the sleeves have an opening therein. In station 16 the bottom or plunger element is pushed up into the container sleeve towards the closed end, and in station 17 the containers are filled with filling goods or material by means of the volume dosing device of the present invention, described more fully hereinbelow. In station 18 each container is provided with a cover or cap to sealingly close the container.

In the present case, it is the station 17 which is of interest. The mechanisms and the different processing stations 14 to 18 of the machine 10 are all driven and controlled from a single camshaft 20. At the filling station 17, three cams 21, 22 and 23 are provided on the camshaft 20. The cam 21, as best seen in FIG. 2, serves to drive a rod 25 for upwards and downwards movement via an angle arm 24. The rod 25 in turn drives a pinion 26 which meshes with a rack-like arrangement or member 27. The rack-like member 27 is journalled for forwards and backwards movement on a guide rod 28 extending tranversely of the volume dosing device housing 29. On the rack member 27 there is rigidly attached a shoulder 30 which has a dog member 31 attached to the end of the piston rod 33 of a piston 32.

The piston member 32 is arranged for sliding movement in a dosing cylinder 38 mounted to the dosing device housing 29. Specifically, the piston member 32 may be moved between first and second end positions within the dosing cylinder 38, the first end position being at the right hand end of the cylinder 38, as shown in FIG. 2, and the second end position being at the left hand portion of the cylinder 38 as shown in FIG. 2. As can be seen in FIG. 2, the cylinder 38 is supported in the dosing device housing 29 substantially parallel to the guide rod 28 on which the rack member 27 travels. Accordingly, rotation of the camshaft 20 causes the rack member 27 to move the piston 32 within the cylinder 38 along a path of movement which is substantially parallel to the guide rod 28.

A through-hole is provided in the shoulder 30 and a threaded screw 34 extends freely through this hole. Both ends of the screw 34 are journalled in the housing 29, with one end of screw 34 extending outside of the housing 29. This one end of the screw 34 is provided with a setting wheel 35 thereon for rotating the screw 34 relative to the housing 29. Also, it will be noted that the screw 34 is substantially parallel to the guide rod 28. An adjustable stop member 36 is threaded onto the screw 34 and is also mounted for free sliding movement along the guide rod 28. As can be appreciated, by rotation of the setting wheel 35 arranged on the outside of the housing 29, it is possible to adjust the positioning of the stop member 36 in the longitudinal direction of the screw 34. This positioning will thus be along a path of movement which is parallel to the path of movement of the piston 32 and piston rod 33.

The adjustable stop member 36 serves to control the location of the first end position of the piston 32 within the cylinder 38 by virtue of the stop member 36 engaging the rack member 27 and shoulder 30 to limit movement thereof in the right hand direction as viewed in FIG. 2. Consequently, it will be appreciated that the stop member 36 determines the dosing volume of material to be dispensed from the dosing cylinder 38 since it is the displacement of the piston 32 within the cylinder 38 between the first and second end positions which determines the volume of material dispensed from the cylinder 38. Accordingly, by adjustment of the longitudinal position of the stop member 36 along the threaded screw 34, the volume of the dose can be easily controlled.

It should be noted that the stop member 36 acts directly on the movement of the piston 32 by virtue of its engagement with the rack member 27, and shoulder 30 which is fixedly attached to the piston rod 33 by means of a dog member 31. There are no intermediate sources creating play or other faults between the stop member 36 and the piston 32.

In the forward end of the cylinder 38 there is provided a settable valve 39 of a conventional type in applications such as that with which the present invention is concerned. Basically, the valve 39 consists of a two position valve member which in the first valve position thereof permits filling of the cylinder 38 with suitable material to be dispensed therefrom, and which in the second valve position thereof permits emptying or expulsion of the material from the cylinder 38. In terms of the embodiment shown in the figures, the second valve position of the valve 39 provides communication between the cylinder 38 and a valve nozzle 41 which is adapted to be inserted through the opening in a container to dispense a measured dose of material from the cylinder 38 into the container. Suitable means (not shown) are provided in association with the valve 39 for introducing material into the cylinder 38 when the valve 39 is in the first valve position.

Switching of the valve 39 between the two valve positions is controlled by means of a second cam member 22 attached to the camshaft 20, as can be best seen in FIG. 3. In particular, suitable links and arms are provided for encasement with the cam 22 for switching the valve 39 between the first and second valve positions in timed sequence with the cam member 21 for controlling the forwards and backwards movement of the piston within the dosing cylinder 38, as more fully described hereinbelow.

In FIG. 4, there is schematically shown an arrangement for raising and lowering of the valve nozzle 41 relative to the dosing device housing 29 for moving the valve nozzle 41 into and out of the opening in the container. This raising and lowering of the valve nozzle is controlled by means of the cam member 23 on the camshaft 20 and suitable linkage and arm system.

In operation, with the valve 39 in the first valve position, the piston 32 is retracted in the cylinder 38, i.e., the piston is moved toward the right as viewed in FIG. 2, to the first end position, the location of which is controlled by the stop member 36, and filling material from a suitable source is injected into the dosing cylinder 38. When a container has been moved into position beneath the valve nozzle 41 by the machine 10, the valve nozzle 41 is lowered into the opening in the container, by means of the cam 23 and its associated linkage and arm mechanism. Next, the valve 39 is moved to the second valve position (by means of the cam 22 and its associated linkage and arm mechanism) to provide communication between the dosing cylinder 38 and the valve nozzle 41 and the piston 32 is moved toward the second end position, i.e., toward the lefthand end of the dosing cylinder 38 as shown in FIG. 2, to dispense a measured dose of material from the dosing cylinder 38 through the nozzle 41 into the container body. This movement of the piston 32 is effected by means of cam 21 and its associated linkage and arm mechanism upon rotation of the camshaft 20. As will be appreciated, these various operations are suitably controlled in timed sequence by appropriate arrangement of the cam members 21–23 on the camshaft 20. Subsequently, the valve nozzle 41 is retracted, the valve 39 positioned in the second valve position and the piston 32 retracted to receive filling material from the source thereof. The amount of displacement of the piston 32 in moving from the second end position to the first end position (as well as the displacement of the piston 32 in moving from the first end position to the second end position) is controlled by the adjustable stop member 36. The positioning of the stop member 36 in turn is controlled by rotation of the setting wheel 35.

It should be realized that due to the stop member 36, the cam 21 will be of a relatively minor importance in controlling the volume of a dispensed dose of material. Specifically, the cam 21 will no longer control the movement of the rod 25 as soon as the cam 21 and cam follower 40 thereof have accomplished displacement of the shoulder 30 on the rack member 27 into abutment or engagement against the stop member 36. That is, if there normally would still remain upwardly directed movement of the rod 25 by virtue of rotation of the camshaft 20 and cam 21, but for the engagement of the shoulder 30 with the stop member 36, the cam follower 40 will simply be raised or removed from the cam 21 and the rod 25 will remain stationary. On the other hand, if an opposite situation were to occur, for instance if rack member 27 has a further stop member at the opposite end thereof (i.e., to control the location of the second end position of the piston 32) the cam follower 40 would simply resiliently avoid the cam member 21 as the cam 21 continues its rotation together with the camshaft 20.

Therefore, in accordance with the present invention, there is provided a controllable volume dosing device capable of adjusting the volume of a measured dose with the use of a minimum of complex mechanisms. Specifically, in accordance with the present invention, there is provided a dosing device which comprises a cylinder 38, piston means 32, 33, 31, 30 including a piston 32 movably mounted for movement within the cylinder 38 between a first end position and a second end position, moving means 20, 21, 24, 25, 26 and 27 for moving the piston means, a valve 39 associated with the cylinder 38 and an adjustable stop member 36 associated with the piston means for defining the first end position of the piston 32. The adjustable stop member 36 is adjustably positioned by means of a threaded screw 34 to engage the piston means (30, 31, 33) to set the location of the first end position of the piston 32 to thereby control the amount of displacement of the piston 32 between the first and second end positions to control or regulate precisely the volume of a measured dose of material to be dispensed from the cylinder 38.

It should of course be appreciated that although in the preferred embodiment only a single stop member 36 has been provided for controlling the location of the first end position of the piston 32, the stop member could just as easily been provided to control the location of the other end position, i.e., the second end position, or a pair of adjustable stop members could have been provided to control the location of both the first and second end positions.

While the preferred embodiment of the present invention has been shown and described, it will be understood that such is merely illustrative and that changes may be made without departing from the scope of the invention as claimed.

What is claimed is:

1. A controllable volume dosing device comprising:
a support structure;
a cylinder supported by said support structure;
piston means for said cylinder, said piston means including a piston mounted within said cylinder for movement between a first end position and a second end position, and a piston rod having a first end connected to said piston and a second end;
a valve associated with said cylinder, said valve being positionable in a first valve position in which material may be introduced into said cylinder, and a second valve position in which material may be expelled from said cylinder, the displacement of said piston within said cylinder between said first and second end positions controlling the volume of a dose of said material;
linear drive means for linearly driving said piston rod to move said piston along a piston path of movement between said first and second end positions, said linear drive means comprising a guide rod supported by said support structure and extending substantially parallel to said piston path of movement, a rack member journalled on said guide rod for linear movement therealong, a dog member carried by said rack member and engaging said second end of said piston rod, and a rotatable pinion engageable with said rack member to move said rack member along said guide rod in response to rotation of said pinion; and
adjustable stop means associated with said piston means for defining said first end position of said piston, said adjustable stop means comprising a threaded member supported by said support structure and extending in a direction parallel to said piston path of movement, and a stop member threadably mounted on said threaded member so that rotation of said threaded member causes said stop member to move along said threaded member to adjust the position of said stop member, said stop member being engageable by one of said rack member and said dog member during movement thereof whereby said stop member sets the location of said first end position of said piston to thereby control the amount of displacement of said piston between said first and second end positions.

2. The controllable volume dosing device of claim 1 wherein said piston is in said first end position when said cylinder has been filled with material introduced into said cylinder when said valve is in said first valve position, and wherein said piston is in said second end position when material has been expelled from said cylinder after positioning of said valve in said second valve position.

3. The controllable volume dosing device of claim 1 wherein said threaded member of said adjustable stop means passes through said dog member so that said dog member is slidable along said threaded member.

4. The controllable volume dosing device of claim 3 wherein said stop member is journalled on said guide rod.

5. The controllable volume dosing device of claim 1 wherein said linear drive means further includes a rotatable drive shaft and interconnection means for connecting said drive shaft to said pinion to rotate said pinion in response to rotation of said drive shaft, and said volume dosing device further including valve responsive means responsive to rotation of said drive shaft for moving said valve between said first and second valve positions.

6. The controllable volume dosing device of claim 5 further including dispensing means associated with said cylinder for dispensing a dose of said material which is expelled from said cylinder when said valve is in said second position.

7. The controllable volume dosing device of claim 6 wherein said dispensing means comprises a valve nozzle and nozzle moving means for moving said valve nozzle along a path of movement transverse to the direction of said piston path of movement, said valve nozzle being movable between a first transverse position in which material may be dispensed from said cylinder when said valve is in said second position, and a second transverse position.

8. The controllable volume dosing device of claim 7 wherein said nozzle moving means is responsive to rotation of said drive shaft.

9. The controllable volume dosing device of claim 8 wherein said valve responsive means is responsive to rotation of said drive shaft to move said valve to said second valve position when said valve nozzle is in said first transverse position.

10. The controllable volume dosing device of claim 9 wherein said nozzle moving means comprises a first cam on said drive shaft and a first cam responsive means connected to said valve nozzle and engagable with said first cam; and wherein said valve responsive means comprises a second cam on said drive shaft and second cam responsive means connected to said valve and engagable with said second cam.

11. The controllable volume dosing device of claim 10 wherein said interconnection means comprises a third cam on said drive shaft and third cam responsive means eccentrically connected to said pinion and engagable with said third cam.

12. A controllable volume dosing device comprising:
a support structure;
a cylinder supported by said support structure;
piston means for said cylinder, said piston means including a piston mounted within said cylinder for movement between a first end position and a second end position, a piston rod having a first end connected to said piston and a second end, and piston rod engaging means engaging said second end of said piston rod;
a valve associated with said cylinder, said valve being positionable in a first valve position in which material may be introduced into said cylinder, and a second valve position in which material may be expelled from said cylinder, the displacement of said piston within said cylinder between said first and second end positions controlling the volume of a dose of said material;
linear drive means for linearly driving said piston rod to move said piston along a piston path of movement between said first and second end positions, said linear drive means comprising a rotatable drive shaft and a linkage mechanism responsive to rotation of said drive shaft for driving said piston rod along a linear path of movement which is parallel to said piston path of movement;
adjustable stop means associated with said piston means for defining said first end position of said piston, said adjustable stop means comprising a threaded member supported by said support structure and extending in a direction parallel to said piston path of movement, and a stop member threadably mounted on said threaded member so that rotation of said threaded member causes said stop member to move along said threaded member to adjust the position of said stop member, said stop member being engageable by said piston rod engaging means during movement of said piston rod engaging means along said linear path of movement whereby said stop member sets the location of said first end position of said piston to thereby control the amount of displacement of said piston between said first and second end positions; and
dispensing means associated with said cylinder for dispensing a dose of said material which is expelled from said cylinder when said valve is in said second position, said dispensing means comprising a valve nozzle and nozzle moving means for moving said valve nozzle along a path of movement transverse to the direction of the path of movement of said piston, said valve nozzle being moveable between a first transverse position in which material may be dispensed from said cylinder when said valve is in said second valve position, and a second transverse position.

13. The controllable volume dosing device of claim 12 further including valve responsive means responsive to rotation of said drive shaft for moving said valve between said first and second valve positions.

14. The controllable volume dosing device of claim 12 wherein said nozzle moving means is responsive to rotation of said drive shaft.

15. The controllable volume dosing device of claim 14 wherein said valve responsive means is responsive to rotation of said drive shaft to move said valve to said second valve position when said valve nozzle is in said first transverse position.

16. The controllable volume dosing device of claim 15 wherein said nozzle moving means comprises a first cam on said drive shaft and a first cam responsive means connected to said valve nozzle engagable with said first cam; and wherein said valve responsive means comprises a second cam on said drive shaft and second cam responsive means connected to said valve and engagable with said second cam.

17. The controllable volume dosing device of claim 16 wherein said linkage mechanism comprises a third cam on said drive shaft and third cam responsive means connected to said piston rod engaging means and engagable with said third cam.

* * * * *